(No Model.)

E. WINANS.
POWER TRANSMITTING CLUTCH.

No. 474,934. Patented May 17, 1892.

WITNESSES:
Sidney Busch
C. L. Weightman

INVENTOR
Edwin Winans
by Wm H Weightman
atty

UNITED STATES PATENT OFFICE.

EDWIN WINANS, OF NEW YORK, N. Y.

POWER-TRANSMITTING CLUTCH.

SPECIFICATION forming part of Letters Patent No. 474,934, dated May 17, 1892.

Application filed April 10, 1890. Serial No. 347,336. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My improvements relate specially to a friction-coupling whereby power or motion to be transmitted in any particular direction is passed automatically from the power or motion giving to the power or motion receiving medium.
Such improvements consist in the arrangement, adaptation, and combination of the several parts or portions comprising the coupling, as hereinafter set forth.

Figure 1:
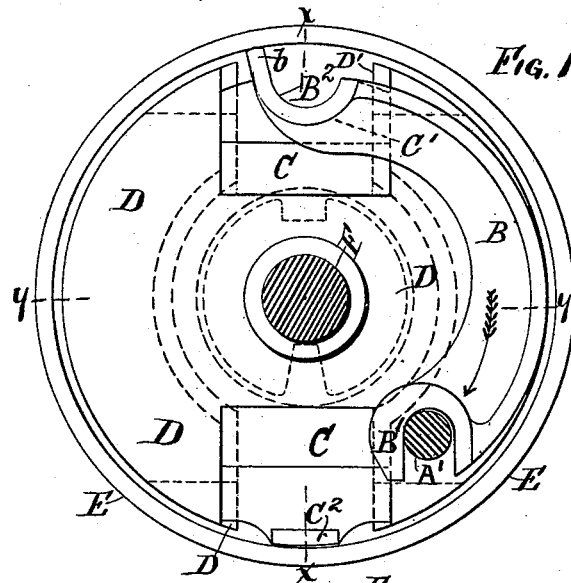
Figure 2:
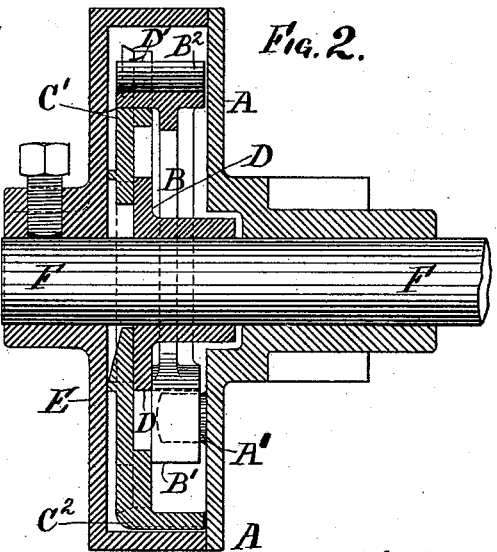
Figure 3:
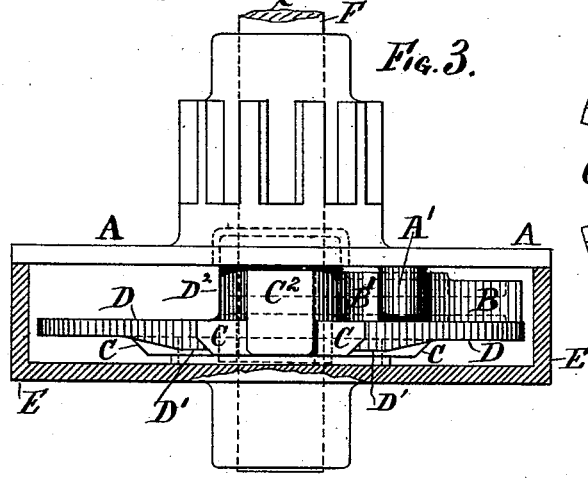
Figure 5:
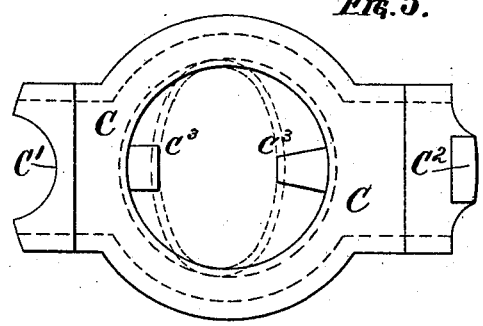
Figure 4:
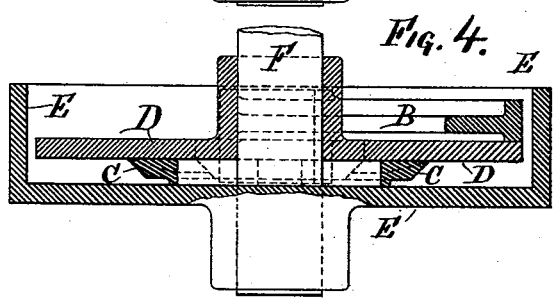
Figure 6:
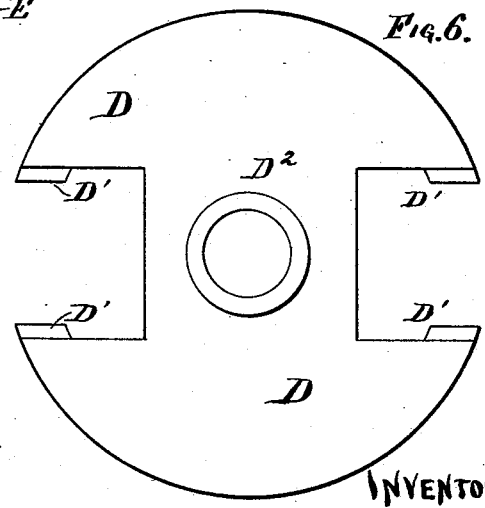

In the accompanying drawings, Figure 1 represents a plan view of a friction-coupling embodying my improvements. Fig. 2 represents a cross-section of the same on line $xx$ of Fig. 1. Fig. 3 represents a side view of the operating portion of the coupling, a part of the inclosing chamber being removed. Fig. 4 represents a cross-section of coupling on line $yy$ of Fig. 1. Fig. 5 is a plan view of friction-slide. Fig. 6 is a plan view of loose carrying-disk of coupling represented in other figures.
Similar letters of reference designate like parts or portions in all the figures.

Letter A designates the face, flange, or hub of a gear-wheel, pulley, or like power or motion giving means, said face being provided with a projecting lug, boss, or pin, (represented at A'.) This projecting boss or lug connects with a slotted operating-lever B, and operating-lever B connects at its opposite end with a sliding grip C, and the sliding grip C moves in a pair of guides in a loose carrying-disk D. E designates a chamber formed within or upon a gear-wheel, face-plate, pulley, or like power and motion transmitting means, or where power or motion is to be transmitted direct to a shaft said chamber is directly attached to said shaft by means of a special hub, as shown in the several figures at F.

As shown in the drawings, the flange A and its attached projection A' represents the power or motion giving means, and chamber E, with its rim or wall, constitutes the power or motion receiving means.

In the operation of this invention motion and power are transmitted by the flange or hub A and its projecting portion A' in the direction shown by the arrow in Fig. 1 to the operating-lever B at its slotted end B', moving said slotted end to the left. The opposite end B² of said operating-lever B moves in a curved bearing C', formed at one end of the friction-slide C. This movement of operating-lever in the direction specified causes the end $b$ to approach and bear upon the rim or wall of chamber E, and the lever B, fulcruming upon said end $b$, forces the friction-slide C in a direction toward the opposite side of the chamber E until the grip portion C² of the friction-slide C comes in close contact with the rim or wall at said opposite side of chamber E. Now a continued pressure of the flange or hub A and its projecting portion A' upon the slotted end B' of operating-lever B in the direction as shown, and of the resulting pressure of the end $b$ of said operating-lever B, as well as of the resulting pressure of the grip portion C² of friction-slide C against opposite portions of the rim or wall of chamber E, effects a revolution of the chamber E and its wheel, pulley, or face or its attached shaft. A movement of the flange or hub A in a direction opposite to that shown by the arrow releases all of the above pressures and chamber E comes to a standstill.

The projecting portions C³ of the sliding grip C are merely for the purpose of hindering the disconnecting of the friction-slide C from the carrying-disk D. These lugs may be easily done away with by making the circular portion of friction-slide C into an oval of a narrow width equal to the distance between said portions C³ C³, as shown by dotted lines in Fig. 5. D' D' represent guide-lugs for the friction-grip C in its to and fro movements.

What I claim as new, and desire to secure by Letters Patent, is—

1. In combination with the motion-receiving and the motion-delivering portions of a friction-coupling, an operating-lever connected with and actuated by said motion-receiving portion and engaging by frictional contact the interior of the motion-delivering portion, a sliding grip actuated by said operating-lever, and a carrying-disk upon which the said sliding grip moves, substantially as and for the purposes set forth.

2. In combination with the motion-receiving and the motion-delivering portions of a friction-coupling, an operating-lever connected with and actuated by said motion-receiving portion and engaging by frictional contact the interior of the motion-delivering portion, a sliding grip actuated by said operating-lever, a carrying-disk upon which said sliding grip moves, and a shaft to which the motion-delivering portion of the coupling is attached, substantially as and for the purposes set forth.

EDWIN WINANS.

Witnesses:
WM. H. WEIGHTMAN,
SIDNEY BUSCH.